(12) United States Patent
Soderberg et al.

(10) Patent No.: US 7,640,492 B2
(45) Date of Patent: *Dec. 29, 2009

(54) METHODS AND APPARATUS FOR PARSING EXTENSIBLE MARKUP LANGUAGE (XML) DATA STREAMS

(75) Inventors: Joel M. Soderberg, Duvall, WA (US); Brian J. Deen, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 757 days.

This patent is subject to a terminal disclaimer.

(21) Appl. No.: 11/175,754

(22) Filed: Jul. 6, 2005

(65) Prior Publication Data
US 2005/0246694 A1 Nov. 3, 2005

Related U.S. Application Data

(63) Continuation of application No. 09/361,372, filed on Jul. 26, 1999, now Pat. No. 6,959,415.

(51) Int. Cl.
*G06F 17/00* (2006.01)
(52) U.S. Cl. .................. 715/234; 715/237; 715/239; 715/242
(58) Field of Classification Search .......... 715/234, 715/229, 237, 239, 242
See application file for complete search history.

(56) References Cited

U.S. PATENT DOCUMENTS

| | | | |
|---|---|---|---|
| 5,956,726 A | 9/1999 | Aoyama et al. | |
| 6,226,675 B1 | 5/2001 | Meltzer et al. | |
| 6,289,501 B1 | 9/2001 | Mutschler, III | |
| 6,411,974 B1 | 6/2002 | Graham et al. | |
| 6,446,110 B1 | 9/2002 | Lection et al. | |
| 6,446,256 B1 | 9/2002 | Hyman et al. | |
| 6,480,865 B1 | 11/2002 | Lee et al. | |
| 6,519,617 B1 | 2/2003 | Wanderski et al. | |
| 6,569,207 B1 | 5/2003 | Sundaresan | |
| 6,571,279 B1 * | 5/2003 | Herz et al. | 709/217 |
| 6,585,778 B1 | 7/2003 | Hind et al. | |

OTHER PUBLICATIONS

Clemm, Kaler 'Versioning Extensions to WebDAV', Jun. 25, 1999, pp. 1-31.*

(Continued)

*Primary Examiner*—Stephen S Hong
*Assistant Examiner*—Matthew J Ludwig
(74) *Attorney, Agent, or Firm*—Lee & Hayes, PLLC

(57) ABSTRACT

Methods and structures for parsing an Extensible Markup Language (XML) data stream are described. In the described embodiment, one or more schema modules are defined and are associated with HTTP requests that are received from a client. The schema module(s) has a function that determines whether an XML data stream conforms to a given schema that is associated with the HTTP request. If a portion of the XML data stream does not conform to the given schema, then the schema module disregards that XML data stream portion. In the described embodiment, each schema module has a plurality of states associated therewith. Each state is associated with one or more schema requirements that relate to a particular element that is evaluated by the schema module. Each state is different from the other states and the number of states is a function of the number of layers or elements that are contained within a particular XML data stream.

18 Claims, 6 Drawing Sheets

OTHER PUBLICATIONS

Cseri, Istvan. et al., "Building XML Parsers for Microsoft's IE4," Oct. 2. 1997, pp. 1-13.

Wilson, Chris & Wood, Lauren, Document Object Model (DOM) Level 2 Specification, W3C Working Draft Jul. 19, 1999, pp. 110-130.

Dridi, Fredj et al., How to Implement Web-based Groupware Systems based on WebDAV. Jun. 16-18, 1999, pp. 1-12.

Idris, et al., "DOM 1.0—Conformance Testing," Jun. 4, 1999, pp. 1-13.

Lyubashevskly, Igor, "VT420 Parser," Aug. 16, 1995, DOS and Windows development group. pp. 1-2.

Maihotra, et al., "XML Schema Requirements," Feb. 15. 1999, pp. 1-5.

Sall, Ken, "XML and Java: XML Parsers in Java," Jan. 12, 1999, pp. 1-7.

Walsh, "Understanding XML Schemas," Jul. 1, 1999, pp. 1-13.

* cited by examiner

METHODS AND APPARATUS FOR PARSING EXTENSIBLE MARKUP LANGUAGE (XML) DATA STREAMS

RELATED APPLICATION

This is a continuation of and claims priority to U.S. patent application Ser. No. 09/361,372, the disclosure of which is incorporated by reference herein.

TECHNICAL FIELD

This invention relates to methods and apparatus for parsing Extensible Markup Language (XML) data streams. In particular, the invention pertains to server-side XML data stream parsing.

BACKGROUND

Extensible Markup Language (XML) is a meta-markup language that provides a format for describing structured data. XML is similar to HTML in that it is a tag-based language. By virtue of its tag-based nature, XML defines a strict tree structure or hierarchy. XML is a subset of Standard Generalized Markup Language (SGML) that provides a uniform method for describing and exchanging structured data in an open, text-based format, and delivers this data by use of standard HTTP protocol. XML utilizes the concepts of elements and namespaces. Compared to HTML, XML facilitates more precise declarations of content and more meaningful data across multiple platforms.

XML "elements" are structural constructs that consist of a start tag, an end or close tag, and the information or content that is contained between the tags. A start tag is formatted as "<tag name>" and an end tag is formatted as "</tag name>". In an XML document, start and end tags can be nested within other start and end tags. All elements that occur within a particular element must have their start and end tags occur before the end tag of that particular element. This defines a strict tree-like structure that can be used to generate an XML document, or by an XML parser to organize and parse the XML document. Each element forms a node in this tree, and potentially has "child" or "branch" nodes. The child nodes represent any XML elements that occur within the start and end tags of the "parent" node.

XML accommodates an infinite number of data schemas. Within each schema, data is represented by element names. Each schema is able to define its own "dictionary" of element names, referred to as a "namespace." Namespace identifiers are used within an XML document to qualify element names, thereby allowing the same names to be used within different schemas without accidental conflicts.

Namespace inheritance within an XML document allows non-qualified names to use "default" namespaces. The default namespace for any particular XML element is whatever namespace is applicable to the parent of the particular element. A namespace specification within an XML document is said to have a "scope" which includes all child nodes beneath the namespace specification.

Typically, XML documents get exchanged between different entities, such as client and server computers, in the form of requests and responses. A client might generate a request for information or a request for a certain server action, and a server might generate a response to the client that contains the information or confirms whether the certain action has been performed. Part of the document exchange process between clients and servers involves parsing the XML documents when they are received. In many cases, it is convenient to represent these XML documents in memory as a hierarchical tree structure. Once the hierarchical tree structure is built, the actual parsing process can begin. Consider the following exemplary XML code:

```
<orders xmlns:person="http://www.schemas.org/people"
        xmlns:dsig="http://dsig.org">
    <order>
        <sold-to>
            <person:name>
                <person:last-name>Layman</person:last-name>
                <person:first-name>Andrew</person:first-name>
            </person:name>
        </sold-to>
        <sold-on>1997-03-17</sold-on>
        <dsig:digital-signature>1234567890</dsig:digital-signature>
    </order>
</orders>
```

This code includes two XML namespace declarations that are each designated with "xmlns". The declarations include a prefix, e.g. "person" and "dsig" respectively, and the expanded namespace to which each prefix refers, e.g. "http://www.schemas.org/people", and "http://dsig.org" respectively. This code tells any reader that if an element name begins with "dsig:" its meaning is defined by whoever owns the "http://www.dsig.org" namespace. Similarly, elements beginning with the "person:" prefix have meanings defined by the "http://www.schemas.org/people" namespace.

Namespaces ensure that element names do not conflict, and clarify who defined which term. They do not give instructions on how to process the elements. Readers still need to know what the elements mean and decide how to process them. Namespaces simply keep the names straight.

FIG. 1 shows how the structure of the above code can be represented in a hierarchical tree structure. In FIG. 1, all of the elements or nodes are set out in an exemplary tree that represents the XML document. Such a structure is typically constructed in memory, with each node containing all data necessary for the start and end tags of that node.

It has been typical in the past to build the entire tree structure, such as the one shown in FIG. 1, before parsing the XML document. For large XML documents, this can consume a great deal of memory and processor time. Thus, it would be desirable to avoid this process if at all possible.

XML parsers are used by various applications to process XML documents. Parsers must know what particular elements mean and how to process them. Tags from multiple namespaces can be mixed, which is essential with data coming from multiple sources across the Web. With namespaces, both elements could exist in the same XML-based document instance but could refer back to two different schemas, uniquely qualifying their semantics. Parsers typically take the form of a code library that can be used by developers in conjunction with higher level languages such as C++ or Java. Using functions provided by such a code library, developers can access the structure of an XML document, enumerate its elements and their attributes, and manipulate the information that is contained within the document's prolog. A simple example would be an XML parser utility that checks for "well-formed" or "valid" documents, and serves as the equivalent of an HTML syntax checker.

XML parsers typically read XML files or data streams and construct a hierarchically structured tree, such as the one appearing in FIG. 1, as a data structure in memory. The XML parser then typically hands off this data structure data to viewers and other applications for processing. So, in the example XML code discussed above, a parser would first build the entire tree structure that is shown in FIG. 1 prior to parsing the document. Only after the entire tree structure was built in memory would the parser begin to start parsing the document.

One problem that is associated with XML parsers such as this is that they have to build an entire hierarchically structured tree in memory before parsing the XML data stream that defined the tree. This approach is not efficient because of the demands it places on the memory that is required to store the tree structure and the speed with which information can be conveyed to a client. For example, this type of approach is not efficient for an application that is doing work in connection with a large quantity of XML data that might be streaming in at a relatively slow speed. Consider, for example, that a client asks a server for a list of all messages of a certain type that are in a certain folder. The entire message list is going to be returned by the server as one large data stream. If the client has to wait for the entire message list to be returned from the server, then the client cannot begin to display any portion of the list until all of the data has been received. This approach requires a large memory overhead (for storing the XML data and building the hierarchical tree structure) which, in turn, impacts the speed with which responses can be used by client applications.

In addition, server-side parsing can be slowed down when an XML data stream includes information that is not understood by the parser. Typically, the parser must process this information regardless of whether it is understood or not.

This invention arose out of concerns associated with providing improved XML parsers and methods of parsing XML data streams that reduce memory overhead and increase the speed with which XML data can be provided and used by a client.

SUMMARY

Methods and structures for parsing an Extensible Markup Language (XML) data stream are described. In the described embodiment, one or more schema modules are defined and are associated with HTTP requests that are received from a client. The schema module(s) has a function that determines whether an XML data stream conforms to a given schema that is associated with the HTTP request. If a portion of the XML data stream does not conform to the given schema, then the schema module disregards that XML data stream portion.

In the described embodiment, each schema module has a plurality of states associated therewith. Each state is associated with one or more schema requirements that relate to a particular element that is evaluated by the schema module. Each state is different from the other states and the number of states is a function of the number of layers or elements that are contained within a particular XML data stream. The schema module(s) use each of its states to evaluate portions of an XML document that is received for compliance with the schema requirement for that document.

DETAILED DESCRIPTION

Overview

Various aspects of the invention provide methods and structures for facilitating server-side XML parsing and for making the parsing activities more timely and efficient. To do this, recognition is made of the fact that many XML requests that are received by a server have a common schema or schemas. More specifically, the server is designed to receive requests that are in one of a small set of fixed schemas that it understands. A schema is a formal specification of element names that indicates which elements are allowed in an XML document, and in which combinations. By knowing ahead of time the particular schemas that might characterize an XML request, measures can be taken to ensure that the request does indeed conform to the schema and that information that is contained in the XML request that does not conform to the schema is ignored or disregarded.

In addition, by knowing the particular schemas that will likely be encountered, parsing activities can be tailored for speed and efficiency. One way that this is done is to define each schema in terms of one or more states. That is, each schema can be considered to have a number of states. The number of states of a particular schema relate to how many layers of elements there are in that schema. For each layer of elements—or for each state—there are processing characteristics that are unique for that state. These processing characteristics can be used to define a set of rules that then define how processing for a particular state is to be carried out. For example, for a particular schema, at one state there may only be one particular type of element that can occur. Thus, if an element that is different from or in addition to the one particular type of element occurs at that state, then measures can be taken to deal with the element that is not supposed to be present at that particular state, e.g. it can be ignored and/or an appropriate message can be returned. Thus, by knowing the state of the schema at any particular time and the processing requirements that are associated with that state, server-side parsing can be greatly streamlined.

Exemplary Architecture

Figure 1:
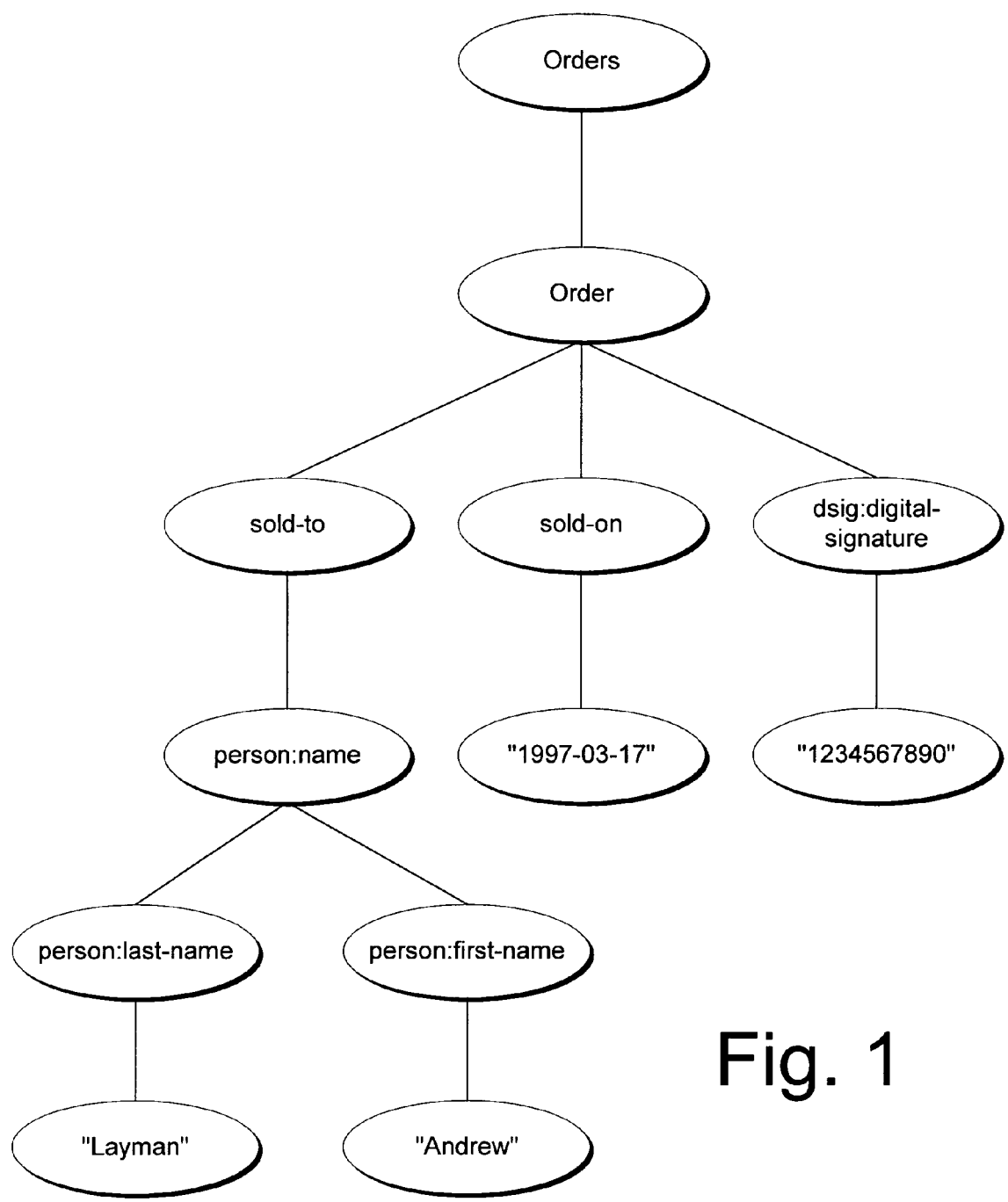
FIG. 1 is an exemplary hierarchical tree structure that represents an XML document that is discussed in the "Background" section.
Figure 2:
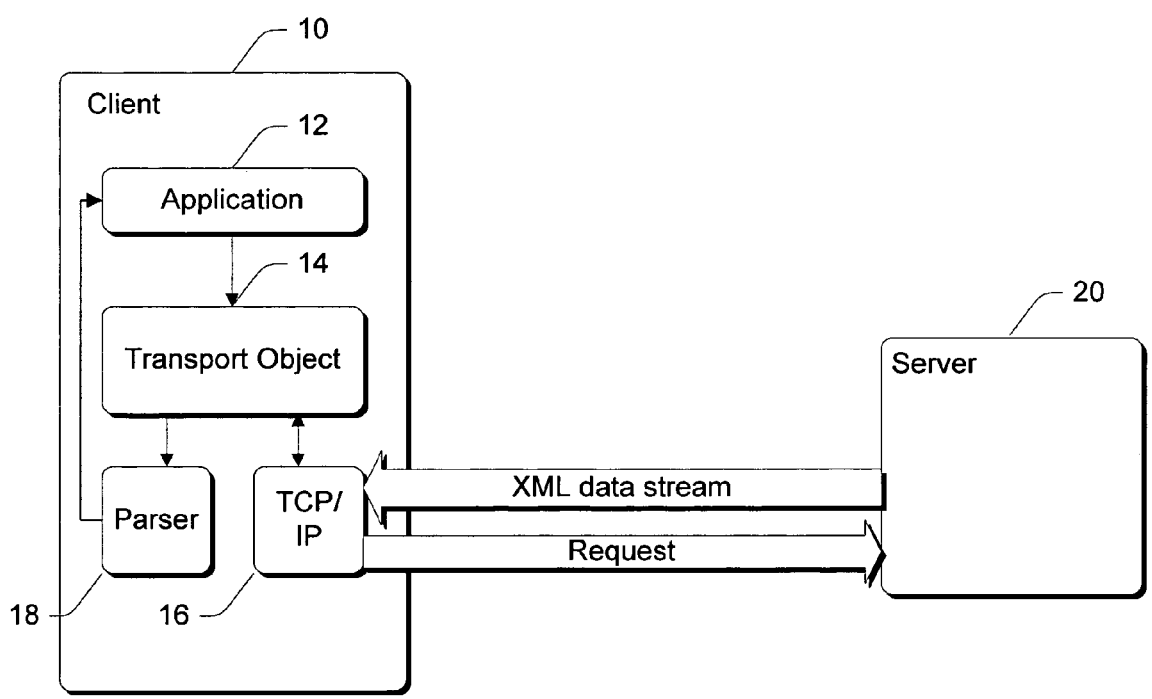
FIG. 2 is a block diagram that illustrates an exemplary client/server architecture that is suitable for exchanging XML documents.

Before describing the various inventive methods and structures that are used in implementing the various parsing functions described below, reference is made to FIG. 2 which shows but one example of an architecture that is suitable for use in connection with various embodiments of the invention. It is to be understood that the architecture that is described constitutes but one example and is not intended to limit the invention in any way.

A client is shown generally at 10 and includes an application 12, a transport object 14, a TCP/IP module 16 and a parser 18. An exemplary application is one that generates requests for XML data that are sent to transport object 14, and receives responses to its request in the form of XML data streams that must be parsed. One specific example of an application is Microsoft's Outlook Express. Transport object 14 can be any transport object that is used in connection with sending and receiving requests. In one specific example that transport object can be a Distributed Authoring and Versioning (DAV) transport object that is designed to work in connection with DAV requests and responses. Specific examples of these are given later in the document. The TCP/IP module 16 can be any suitable module. In operation, an application typically generates a request that will be sent through the transport object 14 and the TCP/IP module 16 to a server 20. The server receives the request, processes it, and returns an XML data stream to the client. Exemplary processing that takes place at the server 20 is described in more detail in connection with FIGS. 4 and 5. The XML data that is returned from the server is received into the TCP/IP module 16 and the transport object 14. The transport object will then begin pushing the data into the parser 18. The parser 18 then begins to operate on the XML data stream by parsing it and providing it to the application 12. In this example, parser 18 is a so-called "node factory" parser because the parser calls a factory object rather than creating nodes manually.

Exemplary Computer System

Figure 3:
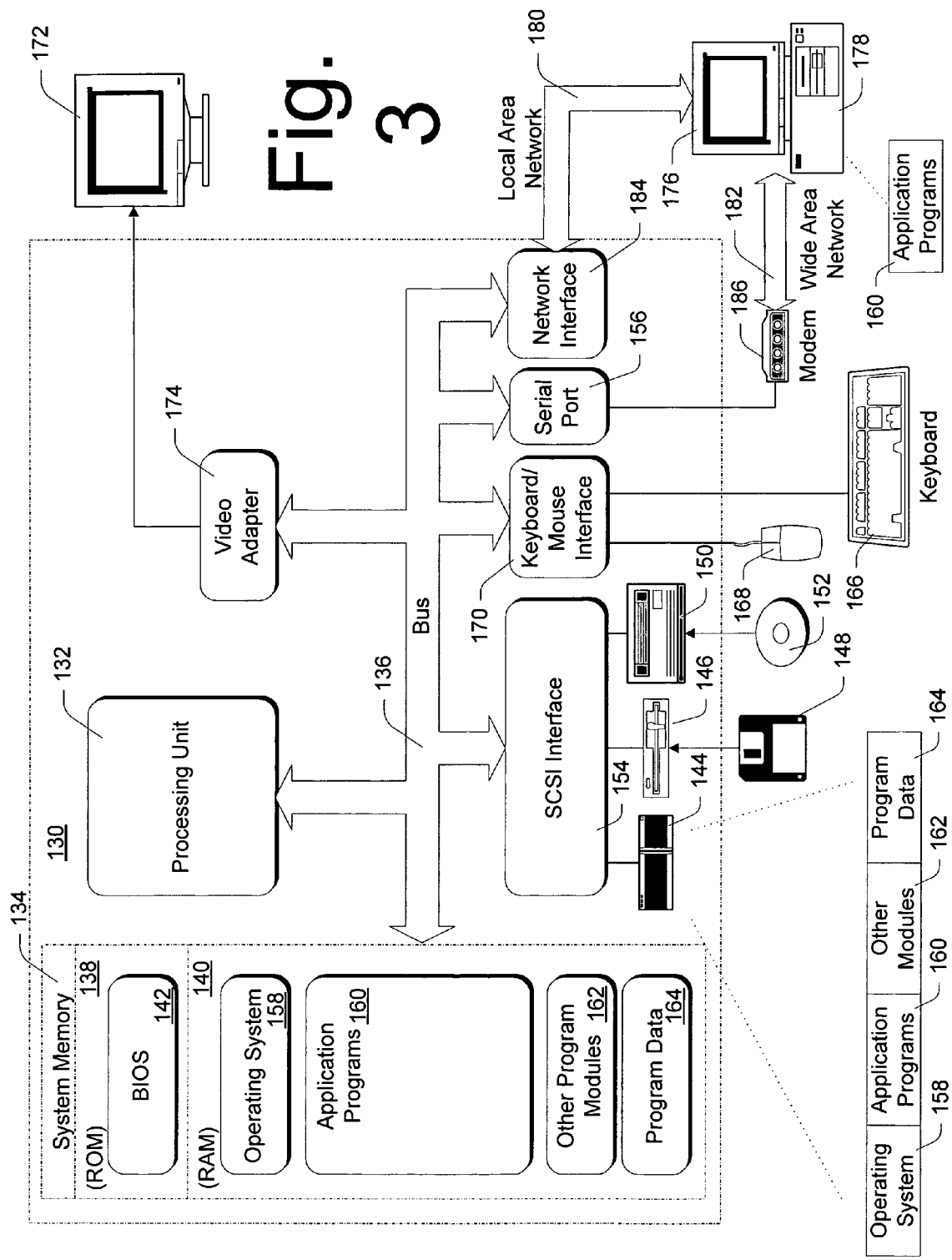
FIG. 3 is a diagram of a computer system that can be used to implement various embodiments of the invention.

FIG. 3 shows a general example of a computer 130 that can be used to implement client and/or server machines. Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program, modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 3. The logical connections depicted in FIG. 3 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

WebDAV

One of the areas of application for the described embodiment is in the context of preparing and sending responses to client Web Distributed Authoring and Versioning (WebDAV) requests. WebDAV is an extension to the HTTP/1.1 protocol that allows clients to perform remote web content authoring operations. This extension provides a coherent set of methods, headers, request entity body formats, and response entity body formats that provide operations for properties, collections, locking and namespace operations. With respect to properties, WebDAV provides the ability to create, remove, and query information about Web pages, such as their authors, creation dates, etc. With respect to collections, WebDAV provides the ability to create sets of documents and to retrieve a hierarchical membership listing (like a directory listing in a file system). With respect to locking, WebDAV provides the ability to keep more than one person from working on a document at the same time. This prevents the "lost update problem," in which modifications are lost as first one author then another writes changes without merging the other author's changes. With respect to namespace operations, WebDAV provides the ability to instruct the server to copy and move Web resources.

In HTTP/1.1, method parameter information is exclusively encoded in HTTP headers. Unlike HTTP/1.1, WebDAV encodes method parameter information either in an Extensible Markup Language (XML) request entity body, or in an HTTP header. The use of XML to encode method parameters is motivated by the ability to add extra XML elements to existing structures, provide extensibility; and by XML's ability to encode information in ISO 10646 character sets, providing internationalization support. In addition to encoding method parameters, XML is used in WebDAV to encode the responses from methods, providing the extensibility and internationalization advantages of XML for method output, as well as input.

The following WebDAV HTTP methods use XML as a request and response format. The reader is assumed to have some familiarity with WebDAV HTTP methods or verbs. A brief description, however, of some pertinent WebDAV HTTP methods or verbs appears in the table immediately below:

| WebDAV HTTP methods | |
|---|---|
| PROPPATCH | The PROPPATCH method processes instructions specified in the request body to set and/or remove properties defined on the resource identified by the Request-URI. |
| PROPFIND | The PROPFIND method retrieves properties defined on the resource identified by the Request-URI, if the resource does not have any internal members, or on the resource identified by the Request-URI and potentially its member resources, if the resource is a collection that has internal member URIs. |
| LOCK | A LOCK method invocation creates the lock specified by the lockinfo XML element on the Request-URI. Lock method requests SHOULD have a XML request body which contains an owner XML element for this lock request, unless this is a refresh request. The LOCK request may have a Timeout header. The LOCK is used to take out a lock of any access type. |
| UNLOCK | The UNLOCK method removes the lock identified by the lock token in the Lock-Token request header from the Request-URI, and all other resources included in the lock. |
| MOVE | The MOVE operation on a non-collection resource is the logical equivalent of a copy (COPY), followed by consistency maintenance processing, followed by a delete of the source, where all three actions are performed automatically. The consistency maintenance step allows the server to perform updates caused by the move, such as updating all URIs other than the Request-URI which identify the source resource, to point to the new destination resource. Consequently, the Destination header MUST be present on all MOVE methods and MUST follow all COPY requirements for the COPY part of the MOVE method. |
| COPY | The COPY method creates a duplicate of the source resource, identified by the Request-URI, in the destination resource, identified by the URI in the Destination header. |
| SEARCH | The SEARCH method allows queries against |

-continued

| WebDAV HTTP methods | |
|---|---|
| | the different properties. |
| MKCOL | The MKCOL method is used to create a new collection. |

Request Processing Overview

Figure 4:
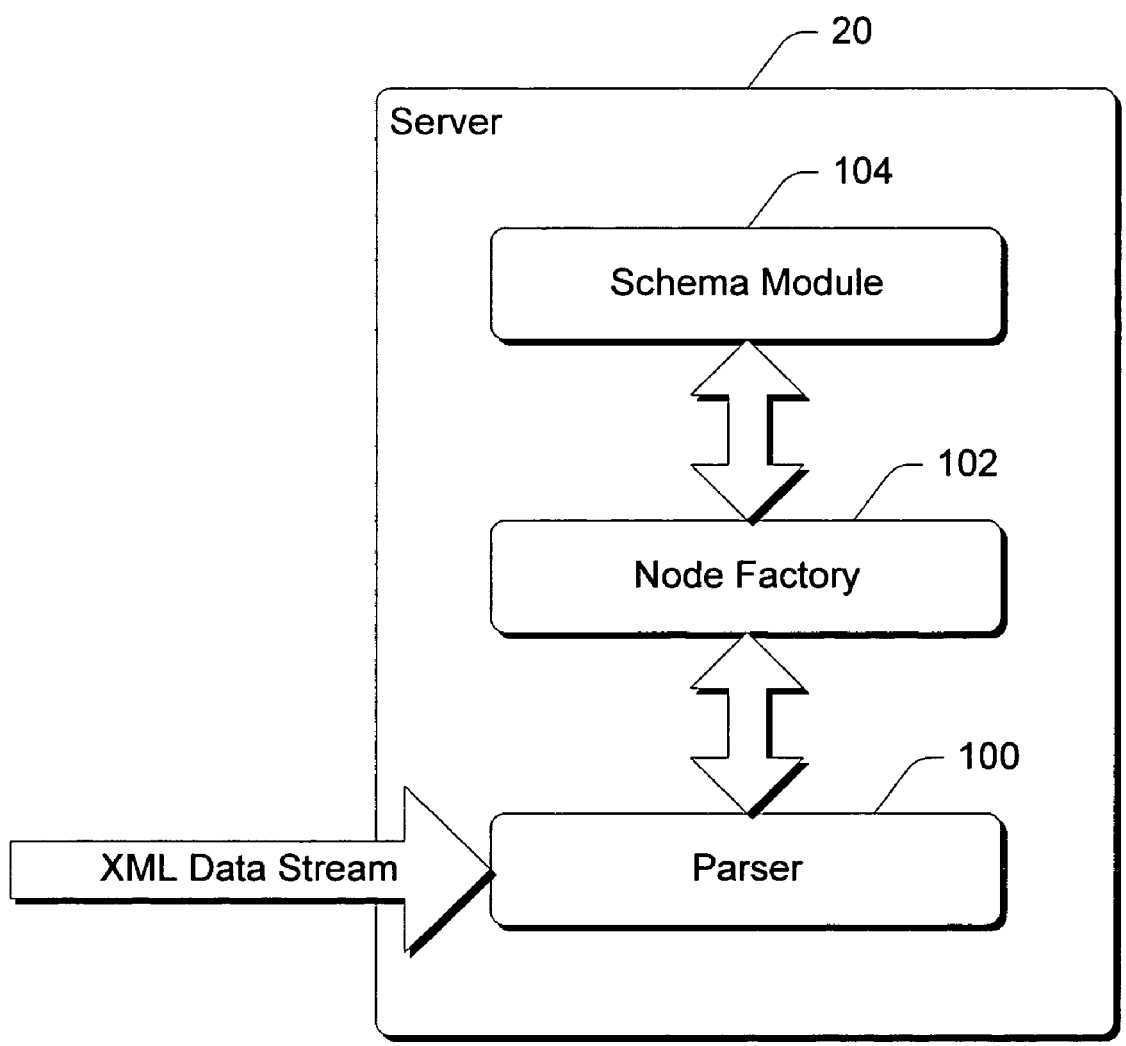
FIG. 4 is a high level block diagram that illustrates aspects of a server in accordance with one embodiment of the invention.

FIG. 4 shows a high level block diagram of parsing system at server 20 that includes an XML parser 100, a node factory 102 communicatively associated with the parser 100, and a schema module 104 communicatively associated with the node factory 102. XML parser 100 typically takes XML input in a variety of ways. This XML input is referred to as an "XML data stream" in this document. The variety of ways that the parser can receive XML input include via a stream, a URL to a document, or text that is pushed to it. As the XML parser 100 parses the XML data stream, it sends parse events to node factory 102. These events are sent to the node factory 102 in the form of a series of method calls that the node factory 102 supports. The method calls enable the node factory to build the elements or nodes that represent the XML document that is characterized by the XML data stream that parser 100 receives. The node factory 102 is primitive in a sense in that it builds the nodes of the XML document that the parser 100 tells it to. For any given XML schema, one or more of the nodes that get built by the node factory 102, or the information that is contained in a particular node may not be germane or necessary and, in fact, can be erroneous.

The schema module 104 is provided as an interface with the node factory 104. Schema modules can be built for each and every particular type of schema that might be expected to be received by the server. Thus, each schema module that might be built is specialized for handling one particular type of schema (or a plurality of similar schemas). The schema module knows the particular processing requirements of its associated schema, the rules that are associated with a particular schema's structure and what is necessary in order for the schema to be properly processed by the server so that an appropriate response can be returned to the client. If any of the rules for a particular schema are violated, the schema module can take appropriate action. In this example, an appropriate action might be to ignore the information that is erroneous to, and not understood by the schema module. Such action might also include generating a particular error message and returning the error message to the node factory 102. By ignoring the information that is not understood by the schema module, parsing activities are made more efficient because this information does not have to be further processed by the server in order to build and return a response to the client. The server might simply return an error message that indicates that this particular information is not understood by the server.

The schema module system gives the server the ability to ignore information that is not properly part of a known schema and to parse an XML document based upon the state of the XML data stream at which parsing is taking place.

Exemplary Schema

When a client's request is received, it has a particular schema associated with it. Each HTTP request (whether an HTTP/1.1 request or a WebDAV request) has a particular schema associated with it. As an example, consider the Web-DAV PROPFIND request below:

```
        PROPFIND/file HTTP/1.1
        Host: www.foo.bar
        Content-type: text/xml; charset="utf-8"
        Content-Length: xxxx
    <?xml version="1.0" encoding="utf-8" ?>
    <D:propfind xmlns:D="DAV:">
        <D:prop xmlns:R="http://www.foo.bar/boxschema/">
            <R:bigbox/>
            <R:author/>
            <R:DingALing/>
            <R:Random/>
        </D:prop>
    </D:propfind>
```

In this example, PROPFIND is executed on a non-collection resource http://www.foo.bar/file. The "propfind" XML element specifies the name of four properties, e.g. bigbox, author, DingALing, and Random whose values are being requested. The schema of this PROPFIND request specifies the element names, e.g. "propfind", "prop", and "allprop", thereby indicating which elements are allowed in an XML document, in which combinations, and in which order. Although the "allprop" element does not appear in this exemplary request, it could be used to request all of the properties of an identified resource. Its proper place in the schema would be inside the "propfind" element.

Schema Modules

Figure 5:
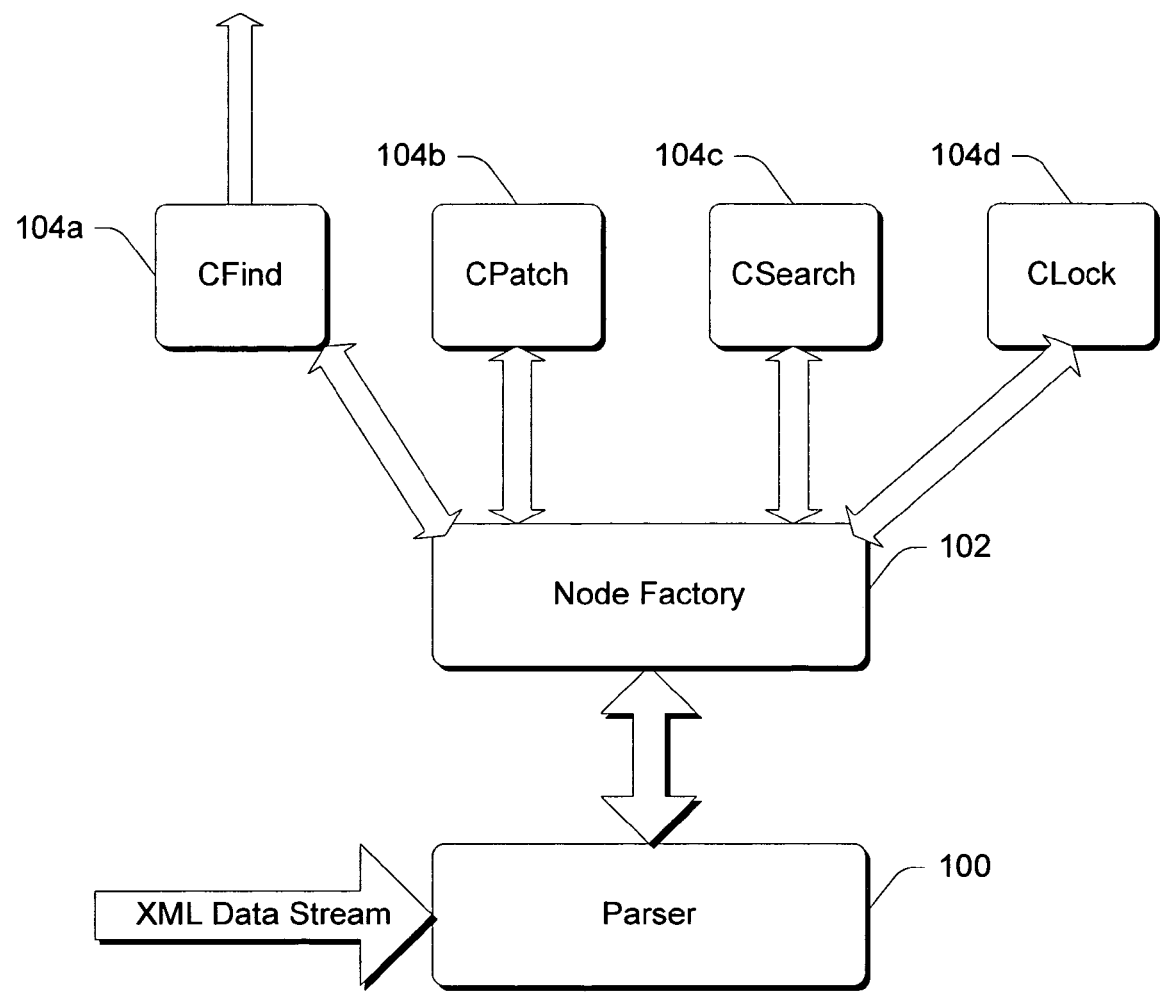
FIG. 5 is a high level block diagram that illustrates aspects of a server in accordance with one embodiment of the invention.

FIG. 5 shows an exemplary architecture that is suitable for use in processing five different types of requests that might be received by server 20, i.e. PROPFIND, PROPPATCH, SEARCH, LOCK, and UNLOCK requests. For each type of request that might be received from the server, a schema module is defined. The collection of schema modules can be implemented as programming objects that have data and associated methods. In this example, four schema modules 104a, 104b, 104c, and 104d are defined for the five requests listed above. The CLock module 104d is provided for both the LOCK and UNLOCK requests because of similarities that these requests share.

When an XML data stream is received into parser 100, it begins parsing the data stream and making various calls on the node factory 102. An exemplary interface that is supported by the node factory 102 is given below. It is to be understood that this constitutes but one exemplary interface and is not intended to be limiting in any way.

```
interface IXMLNodeFactory : IUnknown
{
    HRESULT NotifyEvent(
        [in] IXMLNodeSource* pSource,
        [in] XML_NODEFACTORY_EVENT iEvt);
    HRESULT BeginChildren(
        [in] IXMLNodeSource* pSource,
        [in] XML_NODE_INFO* pNodeInfo);
    HRESULT EndChildren(
        [in] IXMLNodeSource* pSource,
        [in] BOOL fEmpty,
        [in] XML_NODE_INFO* pNodeInfo);
    HRESULT Error(
        [in] IXMLNodeSource* pSource,
        [in] HRESULT hrErrorCode,
        [in] USHORT cNumRecs,
        [in] XML_NODE_INFO __RPC_FAR **aNodeInfo);
    HRESULT CreateNode(
        [in] IXMLNodeSource __RPC_FAR *pSource,
        [in] PVOID pNodeParent,
        [in]USHORT cNumRecs, [in] XML_NODE_INFO
            __RPC_FAR
```
```
            **aNodeInfo);
};
```

To assist in understanding the node factory 102 interface, the XML_NODE_INFO structure that is used by the interface is shown below, along with a table that explains its components:

```
typedef struct __XML_NODE_INFO
{
    DWORD       dwSize;
    DWORD       dwType;
    DWORD       dwSubType;
    BOOL        fTerminal;
    WCHAR*      pwcText;
    ULONG       ulLen;
    ULONG       ulNsPrefixLen;
    PVOID       pNode;
    PVOID       pReserved;
} XML_NODE_INFO;
```

| | |
|---|---|
| DWORD dwSize | The size of this structure in bytes. |
| DWORD dwType | The node type. |
| DWORD dwSubType | The node sub type. |
| BOOL fTerminal | True if this node cannot have any children and so BeginChildren and EndChildren are guaranteed not to be called for this node. |
| const WCHAR* pwcText | This is either a tag name, or a PCDATA text value. The lifetime of this pointer is the lifetime of the CreateNode call. Note that Element/Attribute/PI tag names or certain attribute values (of type ID, NMTOKEN, ENTITY, or NOTATION), may have namespace prefixes. |
| ULONG ulLen | The length of the element or attribute name. |
| ULONG ulNsPrefixLen | The length of the namespace prefix, when present. |
| PVOID pNode | This field can be used by the NodeFactory to RETURN an object representing the node. Since this is PVOID, the NodeFactory can build ANY tree representation it wants - even a raw struct hierarchy. |
| PVOID * pReserved | For private communication between factories. |

If a non-NULL pointer is returned in the pNode field of the NodeInfo struct then this will be passed back in by the parser as the pNodeParent in subsequent calls to CreateNode for the children of that node. In other words, the XML Parser maintains the parse context for you and passes in the appropriate parent pointer based on what it finds in the XML. The pNodeParent for root level nodes is equal to the argument provided in the SetRoot call on the Parser.

The following table sets out a brief explanation of the methods that are supported by the node factory 102 interface set out above:

| Method | Description |
|---|---|
| NotifyEvent | This method tells the NodeFactory where the parser is in the XML document. Some of the possible events include: (1) document start, (2) the parser is |

-continued

| Method | Description |
| --- | --- |
| | about to start parsing a DTD file, (3) DTD file is finished, (4) the parser is about to start the DTD internal subset, (5) the internal subset is finished, (6) parser is about to call CreateNode, (7) start entity, (8) end entity, (9) end document, and (10) more data has just arrived. |
| BeginChildren | This method is called when a node may contain children. For example the node "<foo name="123">" may contain children. But nodes that are empty like "<foo name="123"/>", comment nodes, CDATA nodes, and text nodes will not have a BeginChildren call. You can tell if a node was empty at EndChildren time by checking the boolean argument fEmpty. |
| EndChildren | This method is called when all the subelements of the given element are complete. In other words the matching end tag </FOO> has been reached. This is also called if the tag is an empty tag <FOO . . . /> in which case the fEmpty argument is set to TRUE in case the NodeFactory needs to distinguish between this case and <FOO></FOO>. This method is not called for terminal nodes. |
| Error | This method is called when the parser runs into an error in the XML document. The parser will stop at this point and return the HRESULT error code to the caller. The NodeFactory can call back to the parser to get more information about the error. |
| CreateNode | CreateNode is the main method that gets called during parsing for every element. |

As the node factory 102 receives calls from the parser 100, it updates the state of the processing and builds the current request information. The schema modules, here modules 104a, 104b, 104c, and 104d interface with the node factory and, for each of their individual associated requests, ensure that the request conforms to the appropriate schema, and that the information that is contained in the XML request that does not conform to the schema is ignored or disregarded and/or appropriate messages are generated and sent to the appropriate entities, e.g. the node factory 102.

Schema Module States

Each schema module is uniquely linked to a particular request type that might be received by the server. In some cases, request types, such as the LOCK and UNLOCK requests, can be represented by a common schema module because of shared similarities. Each schema module has one or more states associated with it that are unique to the particular schema with which is it associated. The states are tracked by the schema modules and assist the schema modules in verifying that the output of the node factory 102 contains a valid XML schema for that request.

In this example, the number of states of a particular schema relate to the number of layers of elements that there are in the schema. The states define at least one schema requirement relating to a particular element. Each layer of elements has processing characteristics that are unique for that state. The processing characteristics are used to define a set of rules for that state that define how processing for a particular state is to be carried out. In this example, the rules are schema-based rules that relate to an element's contents. For example, the rules can define which elements can be contained within other elements.

Each schema module keeps track of a state variable that tells the schema module where it is in the XML document. This, in turn, allows the schema module to apply the rules that are associated with each state to the data that it receives from the node factory 102. If one or more of the rules are violated, then the schema module is programmed to take an appropriate action. Appropriate actions can include ignoring any erroneous information and notifying the node factory that information has been received that does not conform to the schema with which that schema module is associated.

Figure 6:
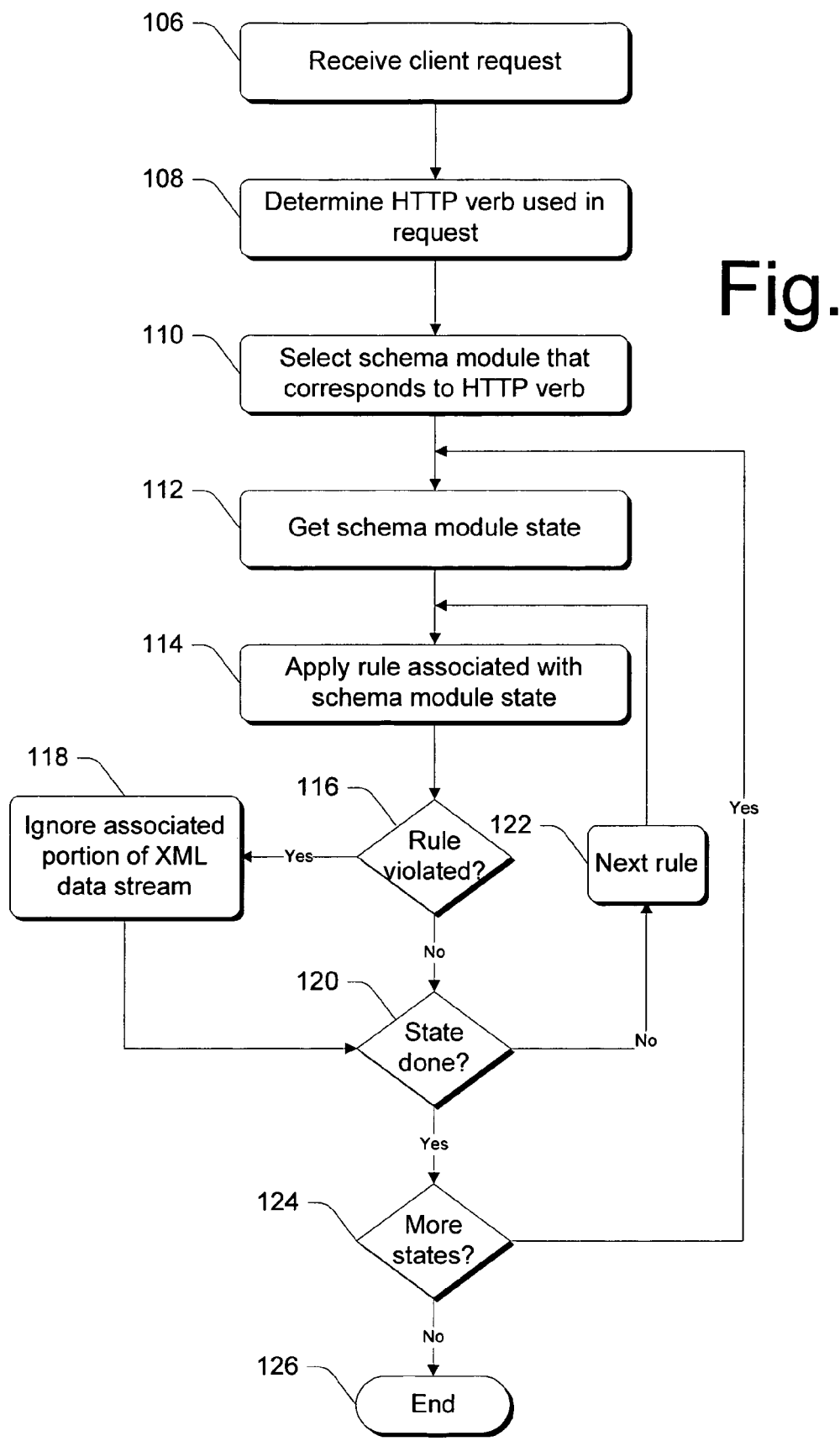
FIG. 6 is a flow diagram that describes steps in a method in accordance with one embodiment of the invention.

FIG. 6 is a flow diagram that describes steps in a method in accordance with one embodiment. Step 106 receives a request from a client and step 108 determines the HTTP verb (WebDAV or otherwise) that is used in the client request. Step 110 selects a schema module that corresponds to the HTTP verb. For the selected schema module, step 112 gets the first schema module state. Step 114 then applies a rule that is associated with the first schema module state to the client request. Step 116 determines whether the applied rule is violated. If the applied rule is violated, step 118 ignores the associated portion of the XML data stream that violates the rule. Step 120 then determines whether processing for the particular state is finished. If the processing for the particular state is not finished, then step 122 gets the next rule and loops back to step 114. If the state is finished, step 124 determines whether there are any additional states that need to be processed. If there are more states, then the method loops back to step 112 for the next state. If there are no additional states to process, then the schema module processing for the client request is terminated (step 126). At this point, the server can continue to process the client request and return a response to the client. Advantageously, those portion of the client request that are not understood by the server have been excluded from further processing. This means that the server can concentrate on the information or data that it understands without being slowed down by having to process information that it does not understand.

As an example, consider the PROPFIND request below:

PROPFIND /secure/hmdata/ HTTP/1.1
Host: www.hotmail.com
Depth: 0
<?xml version="1.0"?>
<D:propfind xmlns :D="DAV:" xmlns:hm="urn:schemas:httpmail:">
    <D:prop>
        <hm:contacts/>
        <hm:inbox/>
        <hm:sendmsg/>
        <hm:sentitems/>
        <hm:deleteditems/>
        <hm:drafts/>
    </D:prop>
</D:propfind>

When the PROPFIND request is received, the CFind schema module 104a (FIG. 5) is selected because it is associated with the PROPFIND request. The CFind schema module 104a has three states depending on the depth within the PROPFIND request. A first state is defined by the root of the document, i.e. the "propfind" element. The second state is defined by what appears inside the "propfind" element. The third state is defined by what appears inside the "prop" element. The processing that takes place at these states is different. For example, for a PROPFIND request, only a "propfind" element can be received at the first state or it is an error. Thus, there is a rule for the first state that specifies that the element that is received must be a "propfind" element. If the element is not a "propfind" element, then that element and all its contents can be ignored. At the second state (inside the "propfind" element), the only elements that can be received are the "prop" and "allprop" elements. (The latter element retrieves all properties for a specified resource while the former retrieves only specified resource properties). Thus, there is a rule for the second state that specifies that the only recognized elements at the second state are the "prop" and "allprop" elements. If any other element is received within the "propfind" element, then it is an error and the contents of the other element can be ignored. When this happens, the CFind schema module 104*a* can ignore everything that is received for the erroneous element until a close tag for that element is received. When the close tag for that element is received, the schema module 104*a* can then begin to substantively process the information that it receives from the node factory. At the third state (inside the "prop" element), virtually any element can be received. These elements have to be interpreted because they can be a request for an arbitrary element. Thus, there is a rule for the third state that specifies that any element that is received within the "prop" element must be interpreted by the server.

As the schema modules process the XML representation provided by the node factory 102, data that are not ignored as part of the schema modules' evaluation are passed along within the server for further processing that includes generating and sending a client response.

The different states that are defined by each of the schema modules enables implementation of its particular schema in a hardwired, efficient way. Information for a schema that is not understood can be quickly disregarded. This greatly streamlines the server's processing tasks because it is only necessary for the server to process information with which the server is familiar. Thus, the server need not process erroneous information that might be sent in a request. Moreover, the state-based nature of the schema modules provides a quick and efficient way to facilitate server-side parsing when different constrained schemas are expected.

Although the invention has been described in language specific to structural features and/or methodological steps, it is to be understood that the invention defined in the appended claims is not necessarily limited to the specific features or to steps described. Rather, the specific features and steps are disclosed as preferred forms of implementing the claimed invention.

The invention claimed is:

1. A computer-implemented method comprising computer-executable instructions for parsing an Extensible Markup Language (XML) data stream comprising:
    defining a schema comprising a plurality of states, individual states being associated with individual elements of an XML data stream, wherein the individual elements comprises one or more rules for processing the associated individual states;
    associating one or more rules with each state;
    receiving the XML data stream;
    evaluating the XML data stream against one or more of the rules for individual elements contained in the XML data stream; and
    disregarding associated portions of the XML data stream if any of the rules that are associated with those portions are violated.

2. The method of claim 1, wherein the one or more rules that relate to an element define which elements can be contained within other elements.

3. The method of claim 2, wherein if a rule that defines which elements can be contained within other elements is violated, disregarding associated portions of the XML data stream until a close tag is received for an element that violates the rule.

4. A computer-readable storage medium having a program thereon which, when executed by a computer, performs the steps of claim 1.

5. A computer-implemented method comprising computer-executable instructions stored for parsing an Extensible Markup Language (XML) data stream comprising:
    defining a schema module that is associated with an HTTP request type that is received from a client, the schema module having a function that determines whether an XML data stream conforms to a given schema that is associated with the HTTP request type;
    evaluating an XML data stream with the schema module;
    utilizing the schema module to track the HTTP request type, wherein the schema module verifies that an output by a node factory contains a valid schema for the HTTP request type; and
    disregarding a portion of the XML data stream if it does not conform to the given schema.

6. The method of claim 5, wherein the defining of the schema module comprises defining a plurality of schema modules, individual schema modules being associated with different HTTP request types.

7. The method of claim 5, wherein the function determines whether there are any unauthorized elements that appear in a client's request.

8. The method of claim 5, wherein function determines whether there are any unauthorized elements that appear in a client's request; the disregarding comprising disregarding the XML data stream portion until a close tag is received for an unauthorized element.

9. The method of claim 5, wherein the HTTP request type comprises a WebDAY request type.

10. The method of claim 9, wherein the WebDAV request type comprises a PROPFIND request.

11. The method of claim 9, wherein the WebDAV request type comprises a PROPPATCH request.

12. The method of claim 9, wherein WebDAV request type comprises a SEARCH request.

13. The method of claim 9, wherein the Web DAV request type comprises one of a LOCK and UNLOCK request.

14. A computer-readable storage medium having a program thereon which, when executed by a computer, performs the steps of claim 12.

15. An Extensible Markup Language (XML) parsing system comprising:
    a memory;
    one or more processors coupled to the memory;
    a parser operable by the one or more processors configured to receive an XML data stream and generate a series of calls as it parses the XML data stream;
    a node factory communicatively associated with the parser and configured to receive the parser's calls and responsive thereto construct a representation of the XML data stream that the parser is parsing; and
    a schema module communicatively associated with the node factory and configured to evaluate the node factory's representation of the XML data stream and determine whether it conforms to a known schema, wherein the schema comprises a plurality of states associated with individual elements of the XML data stream, wherein the individual elements comprises one or more rules for processing the associated individual states; and disregarding associated portions of the XML data stream if any of the rules that are associated with those portions are violated.

16. The parsing system of claim 15, wherein the parsing system comprises a plurality of schema modules, each schema module being associated with a different known schema.

17. The parsing system of claim 15, wherein the schema module corresponds to an HTTP request type.

18. The parsing system of claim 15, wherein the parsing system comprises a plurality of schema modules, each schema module being associated with a different known schema and corresponding to a different HTTP request type.

* * * * *